Figure 1:
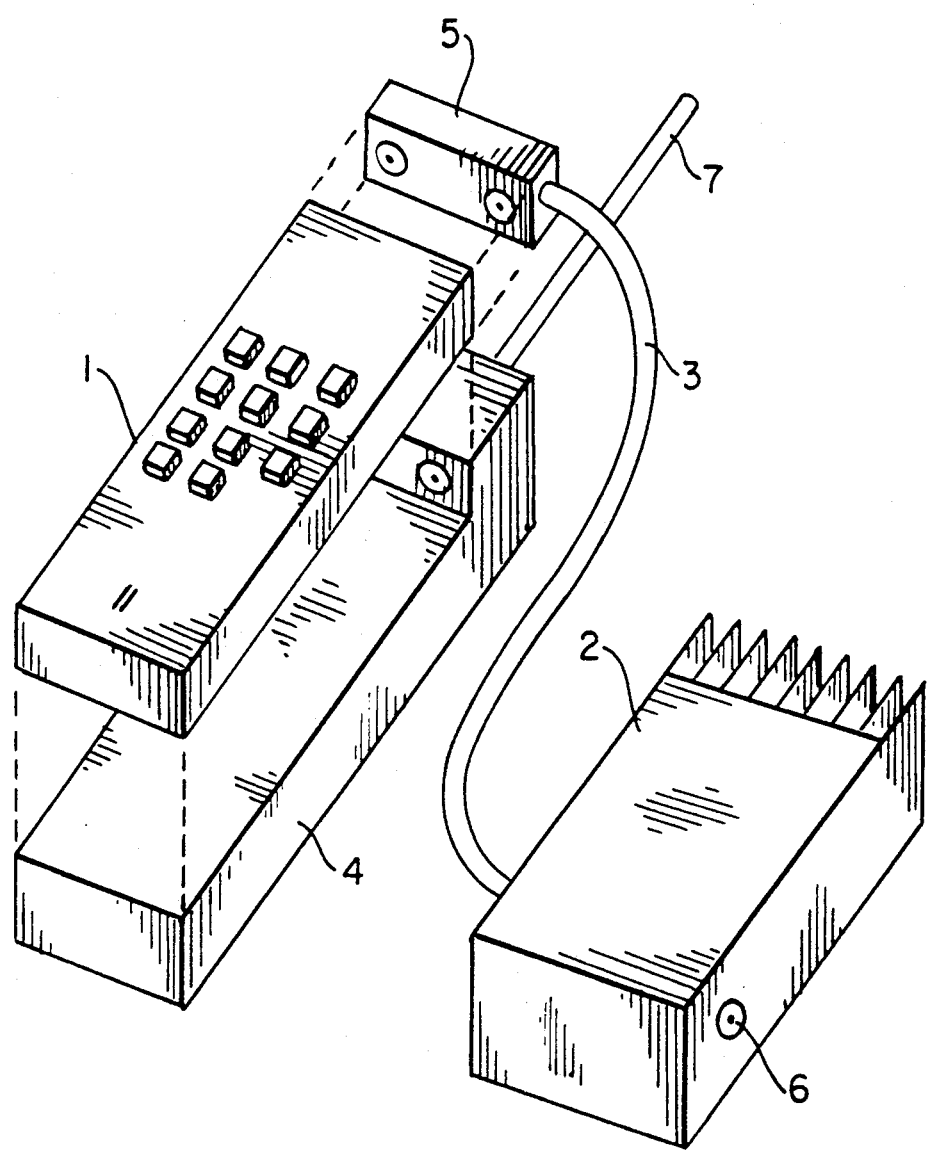

United States Patent [19]

Levanto

[11] Patent Number: 5,170,494
[45] Date of Patent: Dec. 8, 1992

[54] TWO PIECE RADIO TELEPHONE

[75] Inventor: Lauri Levanto, Salo, Finland

[73] Assignee: Nokia Mobile Phones Ltd., Salo, Finland

[21] Appl. No.: 701,372

[22] Filed: May 13, 1991

Related U.S. Application Data

[63] Continuation of Ser. No. 442,226, Nov. 28, 1989, abandoned.

[30] Foreign Application Priority Data

Dec. 8, 1988 [FI] Finland .................... 885702

[51] Int. Cl.⁵ .................... H04B 1/38; H04B 1/04
[52] U.S. Cl. .................... 455/90; 455/127; 455/343; 379/58; 379/61
[58] Field of Search .................... 455/89, 90, 95, 126, 455/127, 343, 349; 379/61, 58

[56] References Cited

U.S. PATENT DOCUMENTS

| | | | |
|---|---|---|---|
| 4,122,504 | 10/1978 | Mallien, II | 455/90 |
| 4,232,390 | 11/1980 | McEvilly, Jr. | 455/89 |
| 4,636,741 | 1/1987 | Mitzdaff | 455/126 |
| 4,726,052 | 2/1988 | Kato et al. | 455/127 |
| 4,768,219 | 8/1988 | Yamagata et al. | 379/61 |
| 4,819,272 | 4/1989 | Shimo et al. | 455/127 |
| 4,881,258 | 11/1989 | Kaiwa et al. | 455/90 |
| 4,916,729 | 4/1990 | Usui | 379/61 |
| 4,995,072 | 2/1991 | Pedigo | 379/61 |
| 5,033,109 | 7/1991 | Kawano et al. | 455/90 |

FOREIGN PATENT DOCUMENTS

| | | | |
|---|---|---|---|
| 0310318 | 4/1989 | European Pat. Off. | 455/89 |
| 3312112 | 10/1984 | Fed. Rep. of Germany | 455/127 |
| 292729 | 11/1988 | Japan | 455/127 |

Primary Examiner—Reinhard J. Eisenzopf
Assistant Examiner—Lisa D. Charouel
Attorney, Agent, or Firm—Darby & Darby

[57] ABSTRACT

According to the invention, the power and weight of a radio telephone can be modified by connecting the same basic unit (1) a desired power unit (2 or 4). The signals received and transmitted between the units (1 and 2 or 4) pass apart from each other.

6 Claims, 3 Drawing Sheets

TWO PIECE RADIO TELEPHONE

This is a continuation division, of application Ser. No. 442,226, filed Nov. 28, 1989, now abandoned.

The present invention relates to a two-piece radio telephone construction.

At present, the use of various radio telephones is becoming very frequent in different countries. The new networks enable telephone transmission of speech as well as of data, on one hand increasing the possibilites of using the telephone, but on the other hand the increased intelligence complicates the device construction. Growing versatility requirements are possed on the device, i.e. the same telephone should be usable as a mobile telephone as well as an easily portable telephone. These requirements result in certain structural problems.

Functionally the radio telephone comprises a telephone handle and a connected radio unit. In particular, the telephones of cellular systems require additionally a logic unit, which guides the device and especially the functions of its radio unit. Moreover, a power supply is needed. The power can be supplied from the accumulator of the radio telephone itself, or from a battery, or from an external power source, for instance the accumulator of a motor vehicle.

The telephone radio unit comprises in a known manner a transmitter and a receiver for bidirectional transmission of speech and data possibly needed for traffic supervision. The power of the transmitter is typically in the range of 0.5–20 W. The transmitter and the receiver use the same antenna. As a strong output signal and a weak received signal pass over the same antenna, the signals have to be separated so that only the received signal reaches the sensitive receiver. The separation of the signals is carried out in a known manner by means of a rf switch or rf filters.

The operational range of the telephone depends on the transmitter power as well as on the sensitivity of the receiver. When the power of the transmitter is increased, the power consumption of the device as well as the waste heat increase, the elimination of which requires a relatively sizeable and heavy cooling element.

In portable radio telephones, the power is supplied from the accumulator or batteries, which again increase the weight and size of the device. If one wishes to manufacture a small and handy portable telephone, a so-called hand-portable telephone, the power of the device and the operation time of the telephone unfortunately have to be reduced.

Small portable telephones are manufactured by placing all the functional units in the handle. Due to the above restrictions as to power and operation time, the user frequently needs a more effective motor vehicle telephone. This is possible either by providing a separate vehicle telephone or by stengthening the output signal of a portable telephone outside the telephone with a special post-amplifier, a booster unit.

The use of two telephones is of course expensive. The use of a booster also involves certain problems. it is technically difficult, since the transmitted signal is once separated from the combined signal, is amplified and is again mixed. A booster amplifier also amplifies all the interferences of the telephone itself. This poses severe requirements on the telephone transmitter, thus increasing costs. Costs even increase to a point at which the use of a booster is no longer noticeably cheaper than the use of two separate telephones. The purpose of the present invention is to provide a telephone device, by means of which the above inconveniences are essentially reduced.

According to the invention, the telephone is divided into two parts. The low power units, like the audio frequency treatment, logic unit and the synthesizer that modulates radio frequencies are placed in the basic unit. The other part comprises the power source, the power transmitter as well as filters or switch means required for the separation of the signals.

Figure 2:
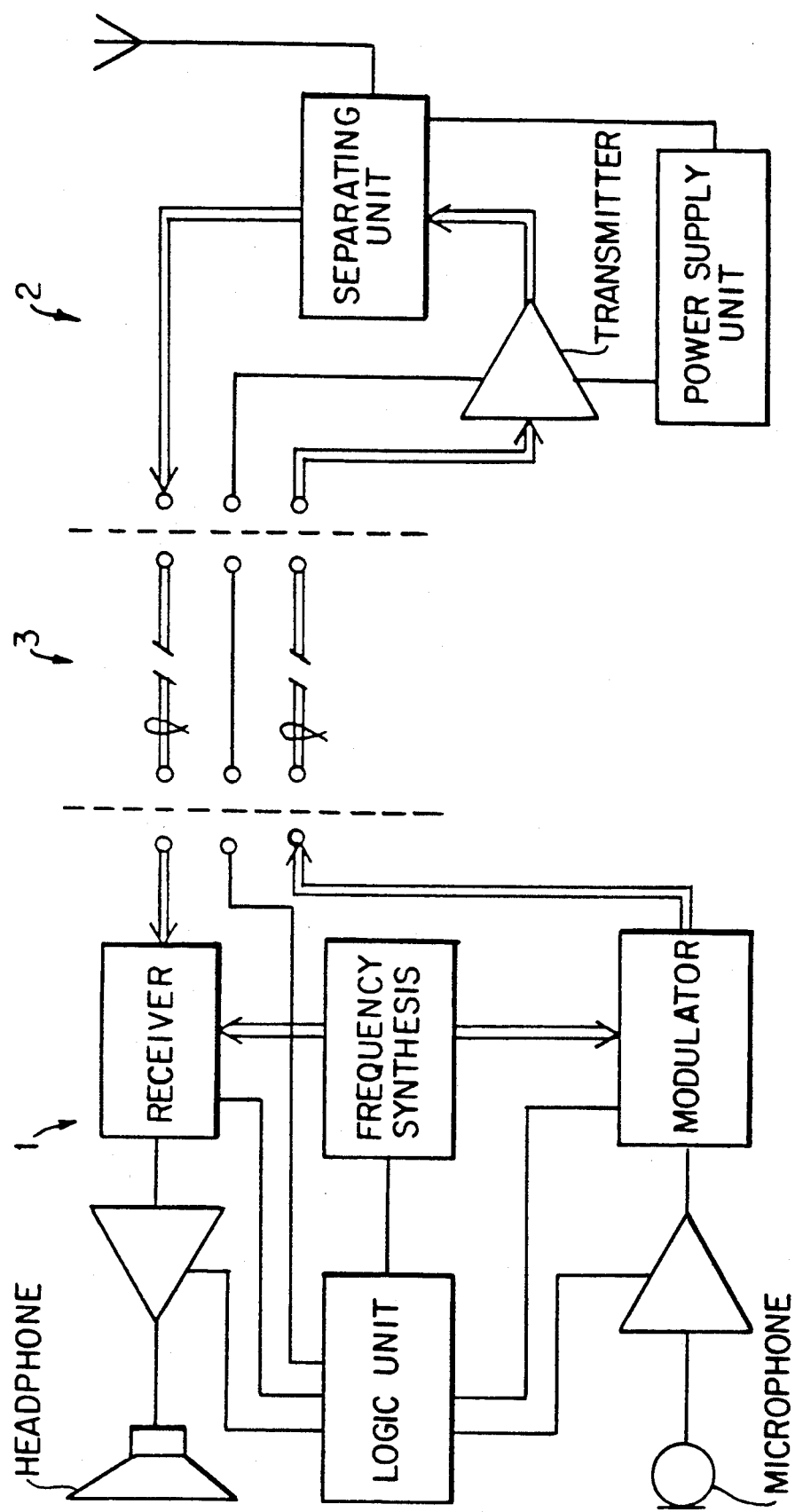
Figure 3:
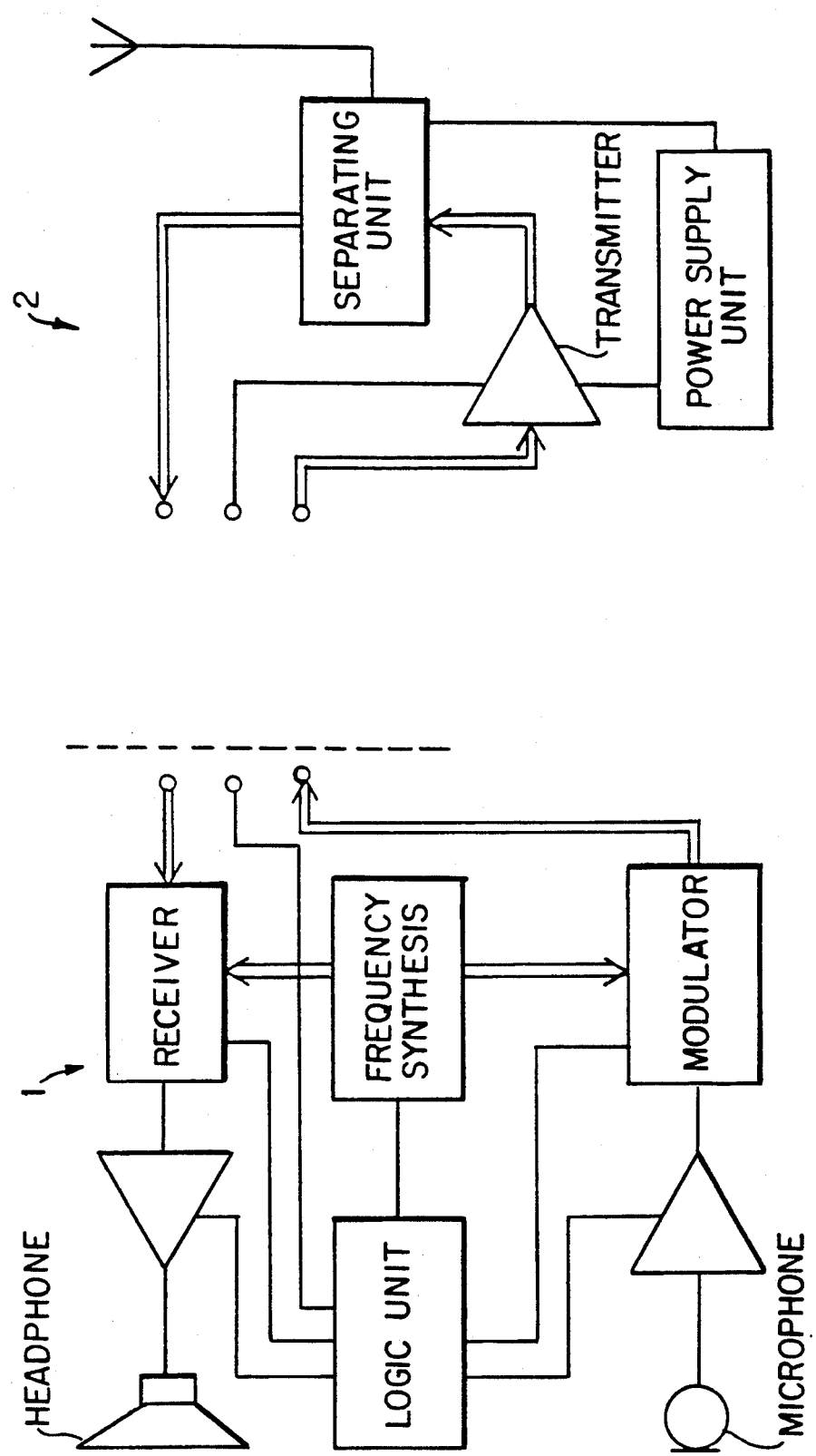

The invention is described in greater detail below with reference to the enclosed figures, in which FIG. 1 shows schematically the two-piece cell system telephone according to the invention, FIG. 2 the logical operating diagram of the two-piece cell system telephone, and FIG. 3 shows the logical operating diagram of an alternative embodiment of a two piece cell system telephone in accordance with the invention.

FIG. 1 illustrates an external construction example of the two-piece mobile telephone of the invention. The telephone comprises the basic unit 1, its low power power unit 4 as well as an exchangeable high power power unit 2, which can be connected by the conductor 3 and the connector 5 to the basic unit 1. When a light portable radio telephone is desired, a configuration is used which comprises a basic unit 1 placed in the handle, containing the audio frequency treatment, a logic unit and a synthesizer modulating the radio frequencies, The low power unit 4 comprises a power supply unit including small accumulators or batteries of connects to an external power supply and a low power transmitter degree as well as an rf directional switch or an rf filter for guiding the received signal to a radio telephone receiver and to prevent a transmitted signal from reaching the receiver. Moreover, the low power power unit 4 comprises an antenna 7 for transmitting and receiving a signal. The basic unit 1 is electrically connected directly to the low power power unit 4 by means of appropriate connectors. The mechanical locking is carried out by using a suitable known locking method, e.g. appropriately designed interconnected grooves, flutes or various attachments. Thus a light and compact hand-portable telephone is provided, which can be used when a limited power and operation time are sufficient.

When used in motor vehicles or other cases requiring higher power, the basic unit 1 is connected to a high power power unit 2, which in principle is identical with the low power power unit 4. The amplification of the output signal of the power unit 2 is much greater than in the unit 4. Thus a more effective power source and a better cooling of the dissipation power are needed. The connection is done by fixing the high power power unit 2 by means of the conductor 3 and the connector 5 to the basic unit 1. An antenna is connected to the connector 6 of the power unit 2 (not shown).

FIG. 2 shows the logic diagram of the telephone according to the invention. As mentioned above, the basic unit 1 comprises a receiver, a modulator, a logic unit, a frequency synthesizer, a microphone, a headphone loudspeaker with an amplifier and a keyboard. The power unit 2 or 4 comprises a transmitter, a signal separating unit, a power supply unit and an antenna either stationary or by way of the antenna connector 6.

When the high power power unit 2 is used, the basic unit 1 is connected to this by means of a separated cable 3.

The two-piece radio telephone of the invention differs from the booster solution of prior art in that the low power output and weak received signal pass in different conductors, and there is no need for separating the transmitted signal from the once mixed signals. Since the transmitted signal passing in the connecting line is a low power signal, it causes less interference in the received signal.

Thus the device according to the invention may comprise one or more replaceable power units according to the purpose of use. Separate power units have a simpler construction and are cheaper than a booster amplifier or a second telephone.

I claim:

1. A multi-piece radio telephone, comprising a basic unit, first unit and second unit, said basic, first and second units being entirely separable from each other, the basic unit having low power circuit elements therein including a radio receiver, a signal portion of a radio transmitter including signal generation circuits for producing a low power modulated radio frequency signal for subsequent transmission by a power portion, and logical functions of a telephone, the first unit including a first power supply capable of operating from at least one of an accumulator, battery and an external power supply, a first power portion of said radio transmitter comprising a first transmitter power stage, first separation means for separating received radio frequency signals from said low power modulated radio frequency signals for subsequent radio transmission, the separated signals moving between said basic unit and said first unit by separate conductive paths when said basic unit is physically connected to said first unit, said second unit being operable independently of said first unit, said second unit including a second power supply capable of operating from at least one of an accumulator, battery and an external power supply, a second power portion of said radio transmitter comprising a second transmitter power stage, and second separation means for separating received radio frequency signals from said low power modulated radio frequency signals for subsequent radio transmission, said second transmitter power stage of said second unit having a higher power output than said first transmitter power stage of said first unit, said first unit and said second unit being subject to interchangeable independent connection with said basic unit, and said first and second power supplies, transmitter power stages and separation means being absent from said basic unit.

2. A multi-piece radio telephone as in claim 1, wherein said first transmitter power stage of said first unit is a low power stage, said first unit being subject to connection directly to said basic unit, and further comprising interconnection means on said basic unit and said first unit, said interconnection means being interengaged to complete at least said conductive paths when said basic unit and said first unit are brought into physical contact with each other to permit operation as a radio telephone.

3. A multi-piece radio telephone as in claim 1, wherein said second transmitter power stage of said second unit is a high power stage, and further comprising a connecting cable for physically and electrically connecting said basic unit to said second unit, said low power modulated radio frequency signal for subsequent transmission and said received radio frequency signal travelling through said cable on separate conductors when said cable connects said basic unit and said second unit.

4. A multi-piece radio telephone as in claim 1, wherein said first unit further includes a first antenna for receiving and transmitting the radio frequency signals, said first antenna being connected to said first separation means.

5. A multi-piece radio telephone as in claim 3, wherein said second unit further includes a second antenna for receiving and transmitting the radio frequency signals, said second antenna being connected to said second separation means.

6. A multi-piece radio telephone as in claim 5, wherein each of said first unit and said second unit further includes an antenna for receiving and transmitting the radio frequency signals, each of the antennas being connected to a respective one of said first and second separation means.

* * * * *